W. H. HAYTER.
WHEEL GUARD OR OBSTRUCTION REMOVER FOR VEHICLES.
APPLICATION FILED FEB. 27, 1914.
1,094,388.
Patented Apr. 21, 1914.
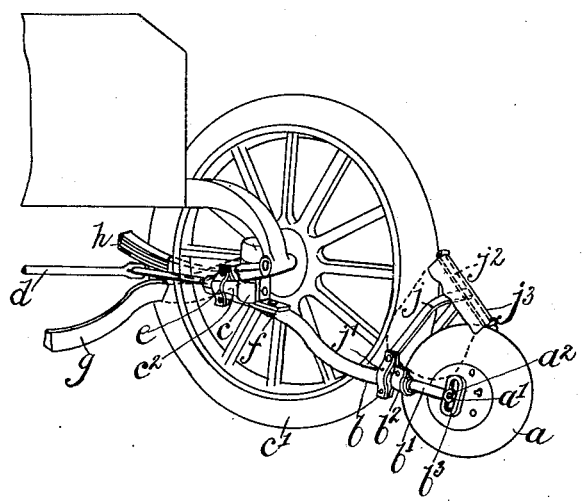
Witnesses:-
H. T. P. Gee
Vollasto Ward
Inventor:-
W. H. Hayter.
By:- Spear Middleton Donaldson & Spear
Attys.

UNITED STATES PATENT OFFICE.

WILLIAM HARRY HAYTER, OF SOUTH NORWOOD, ENGLAND.

WHEEL-GUARD OR OBSTRUCTION-REMOVER FOR VEHICLES.

1,094,388.  Specification of Letters Patent. Patented Apr. 21, 1914.

Application filed February 27, 1914. Serial No. 821,597.

*To all whom it may concern:*

Be it known that I, WILLIAM HARRY HAYTER, subject of George V, King of Great Britain and Ireland, and resident of South Norwood, Surrey, England, have invented certain new and useful Improvements in Wheel-Guards or Obstruction-Removers for Vehicles.

This invention relates to wheel guards or obstruction removers of the class which are rotated by contact with the road wheels.

According to this invention, the front road wheels (and any other of the road wheels that may be desired) of the vehicle are each separately provided with a wheel guard or obstruction remover in this description termed the "obstruction-remover" which is furnished with a resilient—preferably pneumatic—tire and is supported in such a manner that it is held in frictional contact with and follows all steering movements of the road wheel. By providing the obstruction remover with a pneumatic or resilient tire several advantages are gained, of which the following are examples. The shock sustained on meeting obstacles is largely absorbed, thereby not only reducing the risk of damage to the vehicle but also to the obstacle; there is good driving contact between the road wheel and the obstruction-remover; when the road wheel enters a depression in the road the tire of the obstruction-remover yields and flattens when it encounters the edge of the depression thereby enabling the obstruction-remover to be adjusted so as to come close to the road surface; and such a tire has a gripping or clinging action on obstacles which assists the obstruction-remover in lifting and removing them from its path. Furthermore, such a tire acts to keep the road-wheel tire clean thereby reducing the liability to "side-slip" thereof; it also lessens the shock to the driver and to the steering gear when obstacles are encountered, and, therefore, makes driving at night, when the driver is unable to see the obstacles or may be unprepared to meet them, safer.

In order that this invention may be clearly understood and readily carried into effect, I will proceed to describe the same with reference to the accompanying drawings, which show an embodiment of this invention, and wherein the figure illustrates in perspective a road wheel and portion of an ordinary motor vehicle having the obstruction-remover of this invention applied thereto.

Referring to the figure of the drawings $a$ is the obstruction-remover of this invention which as shown is carried by an arm $b$, $b'$ attached to the stub axle $c$ of the usual road wheel $c'$ of the vehicle. Assuming the tire of the road wheel and that of the obstruction-remover to be pneumatic it is convenient in fitting the obstruction-remover in position to have the tire of the road wheel inflated and the tire of the obstruction-remover deflated, then secure the latter in place with its tire in contact with the tire of the road wheel, and finally inflate the tire of the obstruction-remover. In this way good frictional contact is secured between the two tires. Adjustment of the obstruction-remover in a fore and aft direction is obtained by telescoping the forward end $b'$ of the arm into the part $b$, a clip $b^2$ being provided for securing the part $b'$ in place, and in an up and down direction by providing the part $b'$ with a slot $b^3$ in which the spindle $a'$ of the obstruction-remover can be secured in any desired position by means of its nut $a^2$. In place of these means of adjustment, however, means may be provided for adjusting the position of the arm relatively to the stub axle, as will be readily understood.

Any suitable method of holding the obstruction-remover in position may be employed but it has been found convenient in practice to attach the arm $b$ to the stub axle $c$. In Fig. 1 the steering mechanism shown is of a known type consisting of a short arm $c^2$ extending rearwardly from the stub axle and hinged to the cross steering rod $d$. In such a case the arm $b$ is secured by the clip $e$ to the short arm $c^2$ and also, for the sake of extra rigidity, by an angle plate $f$ to the stub axle $c$. $g$ and $h$ are the usual front axle and one of the usual laminated springs respectively of the vehicle.

In order to prevent objects falling between the road-wheel and the obstruction-remover, a guard is provided consisting of a frame $j$ fastened at one side to the arm $b$ by means of a clip $j'$ provided with a cross member $j^2$, and a cover $j^3$ extending downwardly on both sides of the frame $j$ somewhat as shown by the broken lines. The ends of the cross member $j^2$ are rounded off as illustrated so as to avoid damaging the tires of the road wheel and obstruction-remover respectively in the event of the guard becoming distorted.

I claim:—

1. In an obstacle remover for a road wheel, a support, an element longitudinally adjustable of said support, a bearing carried by said element, and an auxiliary wheel vertically adjustable in said bearing.

2. In an obstacle remover for a road wheel, a tubular support, a rod telescopically carried therein having a vertical slot and an auxiliary wheel adjustably held in said slot.

In witness whereof I have hereunto set my hand in the presence of two witnesses.

WILLIAM HARRY HAYTER.

Witnesses:
O. J. WORTH,
W. E. ROGERS.

Copies of this patent may be obtained for five cents each, by addressing the "Commissioner of Patents, Washington, D. C."